United States Patent [19]

Frank

[11] Patent Number: 5,649,502
[45] Date of Patent: Jul. 22, 1997

[54] WASHING TOOL FOR PETS

[75] Inventor: Edward J. Frank, Raanana, Israel

[73] Assignee: Acorn Medical Products Ltd., Raanana, Israel

[21] Appl. No.: 465,022

[22] Filed: Jun. 5, 1995

[51] Int. Cl.$^6$ .................................................. A01K 13/00
[52] U.S. Cl. ........................... 119/665; 401/289; 401/42
[58] Field of Search ........................... 119/158, 83, 86, 119/665; 401/42, 43, 46, 289; 15/322, 320

[56] References Cited

U.S. PATENT DOCUMENTS

| | | | |
|---|---|---|---|
| 1,191,578 | 7/1916 | Englund | 401/42 X |
| 2,103,957 | 12/1937 | Scott | 401/46 |
| 3,056,151 | 10/1962 | Vlacancich | |
| 3,614,244 | 10/1971 | Eck | 401/248 |
| 3,754,557 | 8/1973 | Moore | 132/114 |
| 3,864,780 | 2/1975 | Watkins | 15/29 |
| 4,236,840 | 12/1980 | Kennedy | 401/42 |
| 4,237,822 | 12/1980 | Kaiser, Jr. | 132/114 |
| 4,279,051 | 7/1981 | Malcolm | 15/29 |
| 4,374,444 | 2/1983 | Zhadanov | 15/29 |
| 4,376,441 | 3/1983 | Duncan | 401/289 X |
| 4,447,917 | 5/1984 | Walter | 4/255.09 |
| 4,543,913 | 10/1985 | Wilkeson | 119/85 |
| 4,617,875 | 10/1986 | Holland | 119/85 |
| 4,779,572 | 10/1988 | Freulon | 119/85 |
| 4,841,590 | 6/1989 | Terry et al. | 15/28 |
| 4,913,172 | 4/1990 | Chou | 132/118 |
| 4,922,859 | 5/1990 | Durell et al. | 119/83 |
| 4,995,344 | 2/1991 | Olson | 119/85 |
| 5,004,158 | 4/1991 | Halem et al. | 239/310 |
| 5,067,444 | 11/1991 | Parker | 119/85 |
| 5,095,853 | 3/1992 | Kruger | 119/85 |
| 5,153,962 | 10/1992 | Ritter | 15/28 |
| 5,183,006 | 2/1993 | Robinson | 119/85 |
| 5,261,426 | 11/1993 | Kellett et al. | 132/108 |
| 5,261,427 | 11/1993 | Dolev | 132/200 |
| 5,297,882 | 3/1994 | Kornides | 401/184 |
| 5,304,010 | 4/1994 | Hsing-San | 401/289 |
| 5,307,825 | 5/1994 | Smith | 132/200 |
| 5,311,887 | 5/1994 | Ramsey | 132/114 |
| 5,381,964 | 1/1995 | Reyna | 239/566 |

Primary Examiner—Robert P. Swiatek
Assistant Examiner—Yvonne R. Abbott
Attorney, Agent, or Firm—Mark M. Friedman

[57] ABSTRACT

A device for washing an animal which includes a housing having a water inlet and a water outlet. The device further includes a head plate mounted on the housing in the vicinity of the water outlet. The head plate has a base and a plurality of outwardly extending flexible hollow robes which are formed with the base. The hollow tubes are hydraulically connected to the housing.

17 Claims, 3 Drawing Sheets

WASHING TOOL FOR PETS

FIELD AND BACKGROUND OF THE INVENTION

The present invention relates to devices for washing or shampooing pets, and, more particularly, to devices for washing hairy or furry animals, such as dogs.

A variety of grooming devices are currently available. These include a wide variety of brushes and a number of tools for dispensing liquid, such as shampoo, soap or medications, from a reservoir, typically housed in the handle of the device, to the skin and coat of the animal.

However, none of the presently known devices makes it possible to readily and effectively wash the animal's coat, which is an essential step in the grooming process.

There is thus a widely recognized need for, and it would be highly advantageous to have, a washing device which is capable of continuously delivering variable amounts of water directly to the animal's skin during the soaping or shampooing and rinsing processes and which is further capable of penetrating through the animal's fur so as to massage the animal's skin in order to both remove dirt which might otherwise remain in place and to calm and relax the animal during the washing process.

SUMMARY OF THE INVENTION

According to the present invention there is provided a device for washing an animal, comprising: (a) a housing having a water inlet and a water outlet; and (b) a head plate mounted on the housing in the vicinity of the water outlet, the head plate having a base and a plurality of outwardly extending flexible hollow tubes formed with the base, the hollow tubes being hydraulically connected to the housing.

According to further features in preferred embodiments of the invention described below, the housing further includes a compartment for accommodating an additive such as shampoo, soap or medication.

According to still further features in the described preferred embodiments, the device further includes a substantially rigid retainer plate mounted on the water outlet of the housing and adjacent to the head plate.

The present invention successfully addresses the shortcomings of the presently known configurations by providing a device for rapidly and effectively washing animals which makes it possible to continuously deliver water, which preferably also includes shampoo or another cleaning agent, or a medication directly to the skin of the animal and which permits the simultaneous or sequential massaging of the skin of the animal during the washing process.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
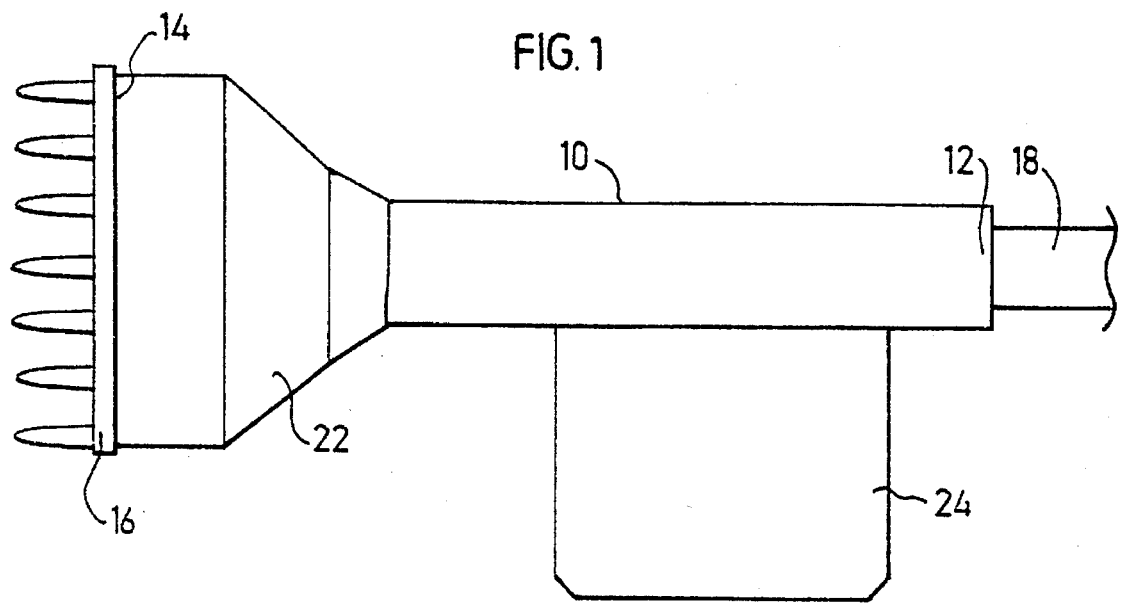
FIG. 1 is a side view of one possible configuration of a device according to the present invention.

The present invention is of a device which can be used for grooming animals, and, more specifically, for washing and massaging pets.

The principles and operation of a device according to the present invention may be better understood with reference to the drawings and the accompanying description.

The present device is of a washing massage brush for animals which easily and effectively permits the wetting, washing brushing and rinsing of an animal's coat and skin. The water reaches the skin of the animal directly from the ends of a plurality of flexible hollow tubes, or bristles, which extend from the head plate. The head plate is connected to a source of running water such as a bathroom faucet or a garden hose. Preferably, the pressure of the water, and hence the flow rate, is adjustable either at the water source or, more preferably, at the device itself.

Preferably a rigid retainer plate is inserted directly behind the head plate and serves to ensure that the head plate is not dislodged by the outward force of the water and does not cave inward. The retainer plate further serves to ensure that the water is effectively distributed among all the tubes.

Another object of the invention is to insure that shampoo or other cleaning agent, when used, is delivered directly and evenly to the animal's skin so as to prevent the inadvertent spillage and waste of the shampoo or cleaning agent. A shampoo, soap or medication reservoir is preferably attached to the housing and provides for the appropriate mixing of the shampoo with water prior to the dispensing of the shampoo-containing water. Delivery of the water through the tubes ensures that the water and shampoo are delivered to precisely the correct destination.

The device of the present invention also functions as a massage tool for the purpose of relaxing the animal and providing effective cleaning action and stimulation of the skin of the animal. The device is preferably made of flexible plastic material which affords the appropriate degree of flexibility needed to use the brush as a massage tool. The nature, distribution and dimensions of the tubes, or bristles, are selected to provide the animal with comfortable and effective grooming.

A device according to the present invention provides a washer attachment which is adapted not only to spray a liquid, such as water, upon an animal but also to vigorously massage the animal. In addition, additives such as soap, shampoo or medication may be automatically added from a built-in reservoir to form foam and soapsuds.

An important advantage of the present invention is that when it is used with animals the washer feels like a brush or other grooming device with which the animal is familiar so that washing and the application of shampoo, soap and/or medication are effected without frightening or upsetting the animal. An additional advantage is the versatility of the device with the availability of different heads for different type animals.

A device according to the present invention may be used in all stages of the pet washing or related process. Without in any way limiting the scope of the present invention, pet washing operations typically include the following operations. The pet is first massaged using a device according to the present invention with the water supply cut off. Then, while continuing the massaging action, the water supply is activated to provide a rinse. Once the pet has been thoroughly rinsed, soap, shampoo, medication, and the like, is allowed to be introduced to the pet thorough the device. Finally, the flow of soap, shampoo, medication, and the like, is cut off, providing a final water rinse of the pet.

Figure 2:
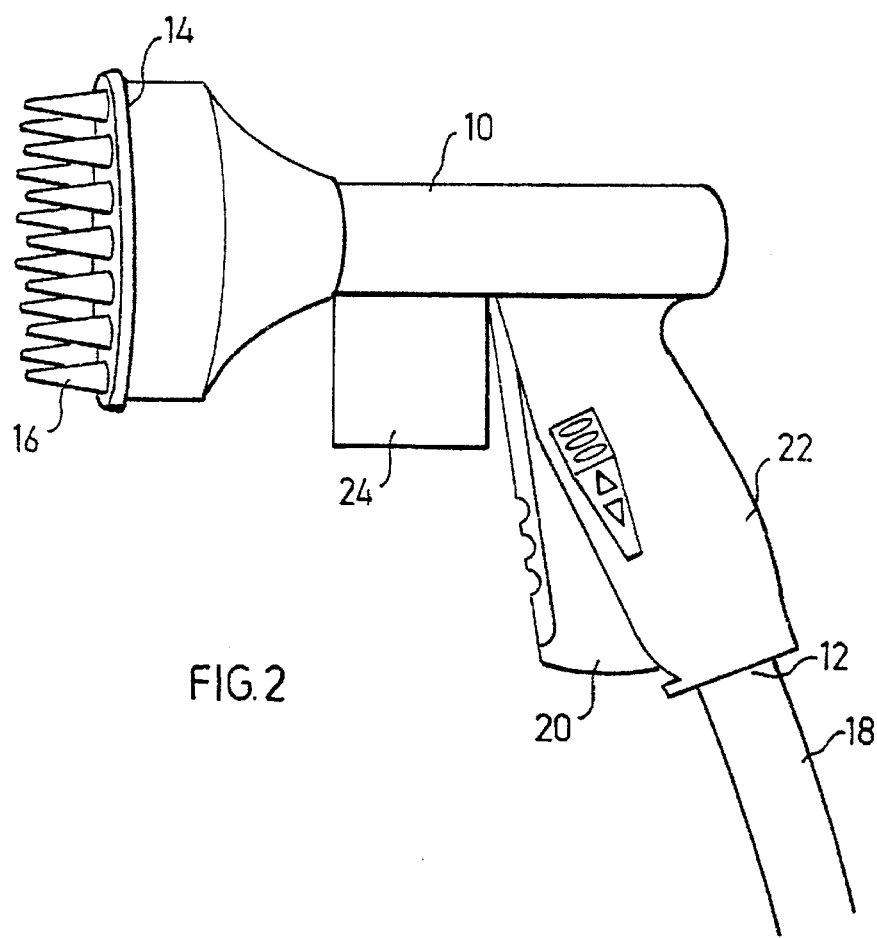
FIG. 2 is a side view of another possible configuration of a device according to the present invention.

Referring now to the drawings, FIGS. 1 and 2 illustrate in side view how a device according to the present invention might look when assembled.

A device according to the present invention includes at least two basic components. First, the device includes a housing 10 which features a water inlet 12 and a water outlet 14. Second, the device includes a head plate 16 which is mounted on housing 10 in the vicinity of water outlet 14.

Housing 10 resembles a conventional garden hose attachment commonly used to water gardens, cars and the like. Water inlet 12 is normally attached to a hose 18 which may be a garden hose, and the like. Hose 18 is, in turn, connected to a suitable source of running water, such as a water faucet.

The water pressure, and hence the flow rate through housing 10, can preferably be controlled. This may be achieved at the water source or, preferably, may be controlled through a suitable mechanism in the housing, such as, for example, a suitable valve (not shown) which is controlled through, for example, trigger 20 (FIG. 2).

Housing 10 preferably includes a handle 22 for facilitating the grasping of housing 10 by a user during use.

Preferably, housing 10 further includes a compartment 24 for accommodating an additive, such as a cleaning agent, most typically shampoo. Compartment 24 is in hydraulic communication with housing 10 so that at least some of the water flowing through housing 10 also passes through compartment 24, allowing some of the contents of compartment 24 to be dissolved in the water or to be otherwise entrained into the flowing water stream. Preferably, a mechanism (not shown) is provided for alternately connecting and disconnecting compartment 24 from flow communication with housing 10.

A device according to the present invention is characterized in that it includes head plate 16 (FIGS. 4 and 5) which is mounted on housing 10 in the vicinity of water outlet 14. The mounting of head plate 16 is such that substantially no water can leave housing 10 without going through head plate 16. Head plate 16 is made up two sections, which are formed with each other—base 30 and a plurality of outwardly extending flexible hollow tubes 32 which are hydraulically connected to housing 10. Base 30 and tubes 32 may be connected to each other or, preferably, may be integrally formed with each other, as by injection molding, for example.

Base 30 includes openings which, together with hollow tubes 32 form passageways hydraulically connecting the inside of housing 10 with the outside so that water is able to flow from housing 10 through base 30 and hollow tubes 32 and to the outside of the device, exiting tubes 32 at their distal tips.

Figure 5:
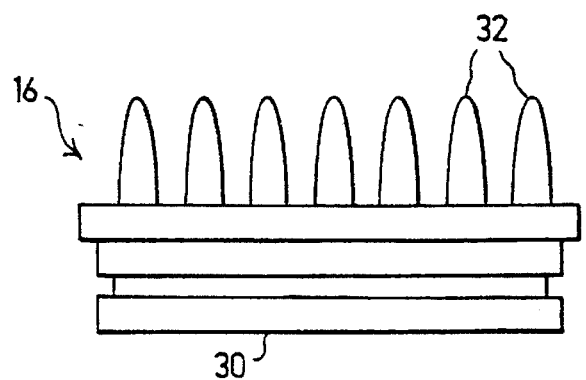
FIG. 5 is a side view of the head plate of FIG. 4.

Tubes 32 may be of any suitable shape and size. Tubes 32 may be substantially cylindrical (FIG. 2) or, preferably, may be substantially conical in shape with a relatively large diameter portion near base 30 which decreases in diameter toward the distal tip of tube 32 (FIG. 5).

Tubes 32 may be of substantially the same lengths so that the distal ends of tubes 32 are substantially co-planar. Alternatively, tubes 32 may be of different lengths so that the distal ends of tubes 32 are not co-planar. The actual lengths of tubes 32 can be selected to fit specific applications. Thus, for long-haired animals, such as collies, tubes 32 may have a lengths of about 1 to about 2 cm while for short-haired animals, such as a beagle tubes 32 may have a lengths of about 0.5 to about 1 cm. It may desirable for a particular user to keep several head plates 16 on hand, each of somewhat different lengths tubes 32 so that the appropriate head plate 16 can be used depending on the current length of hair of the particular animal being treated. Additionally or alternatively to having different lengths, tubes 32 of different degrees of hardness may be used so as to better suit various applications.

Figure 4:
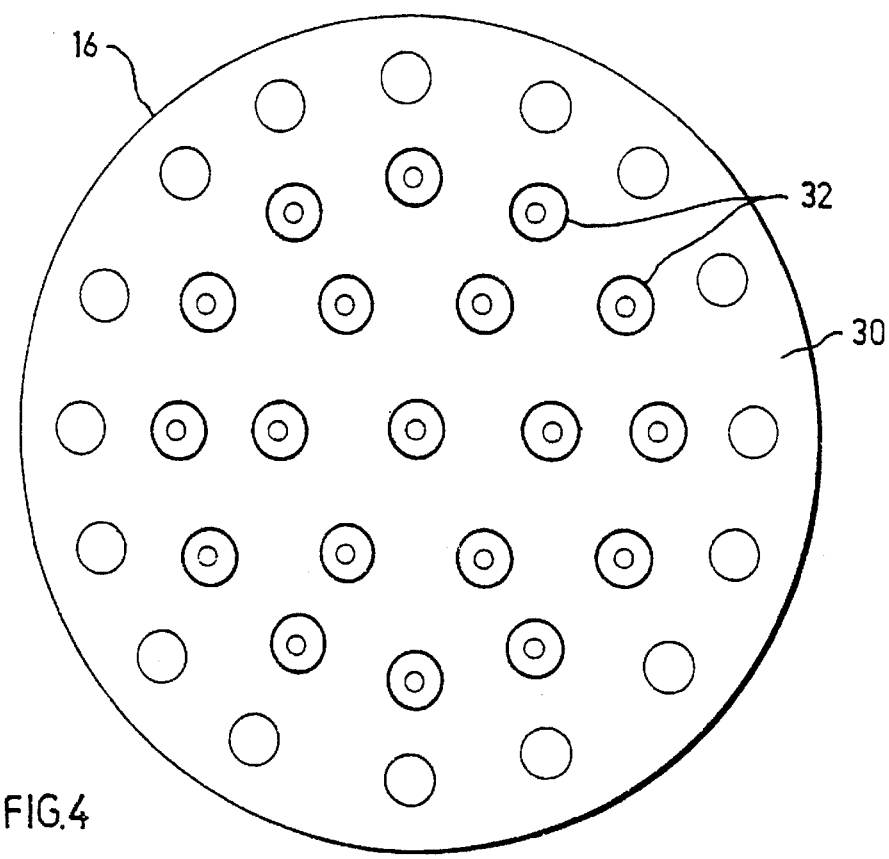
FIG. 4 is a plan view of a head plate of a device according to the present invention.

Tubes 32 may be arranged in any convenient fashion. Preferably, tubes 32 are arranged in a circular pattern with the centers tubes 32 defining a circle. Most preferably, tubes 32 are spaced in two or more concentric circles (FIG. 4).

Head plate 16 may be made of any suitable material. Preferably, head plate 16 is made of a suitable plastic, such as a suitable polypropylene. While base 30 of head plate 16 may take on any convenient shape corresponding to water outlet 14. Preferably, base 30 is substantially circular.

The dimensions of tubes 32 and the nature of the material of which head plate 16 is made are such that tubes 32 are somewhat flexible to provide a soothing and effective massage yet are sufficiently rigid to readily penetrate the hair or fur of the animal and reach the skin of the animal.

Figure 3:
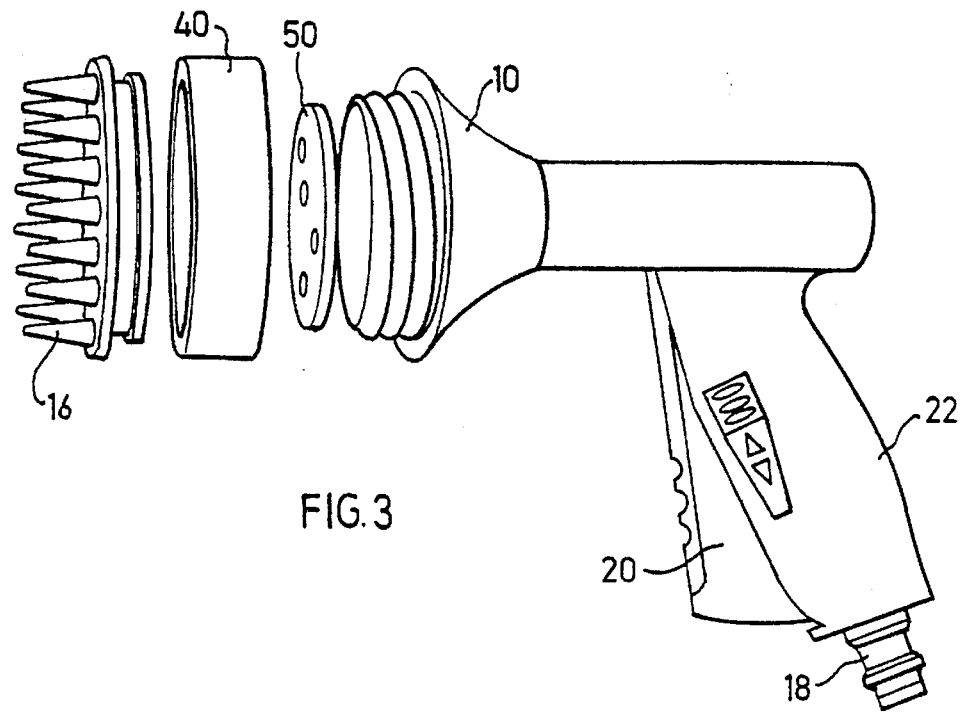
FIG. 3 is an exploded view showing one possible assembly of a device according to the present invention.

Base 30 of head plate 16 is connected to housing 10 by any convenient means. One such possible connection may through use of a coupler 40 (FIG. 3). Coupler 40 is preferably internally threaded so as to engage an externally threaded anterior portion of housing 10. An anterior lip of coupler 40 serves to securely hold the periphery of base 30 to housing 10.

To prevent the inward collapse of base 30 or its dislodgement outward under the influence of the water pressure, a device according to the present invention preferably includes a substantially rigid retainer plate 50 (FIG. 3) which is mounted at water outlet 14 of housing 10 and immediately adjacent to the head plate 16. Retainer plate 50 is preferably made of a relatively hard plastic and is dimensioned so that when coupler 40 is activated, the periphery of retainer plate 50 is securely connected to housing 10, thereby providing support for base 30 of head plate 16 across its entire extent.

Retainer plate 50 features one or more openings therethrough to allow water from housing 10 to pass through retainer plate 50 so as to reach head plate 16. Retainer plate 50 typically has substantially the same shape as base 30, preferably, both retainer plate 50 and base 30 are substantially circular.

Figure 6:
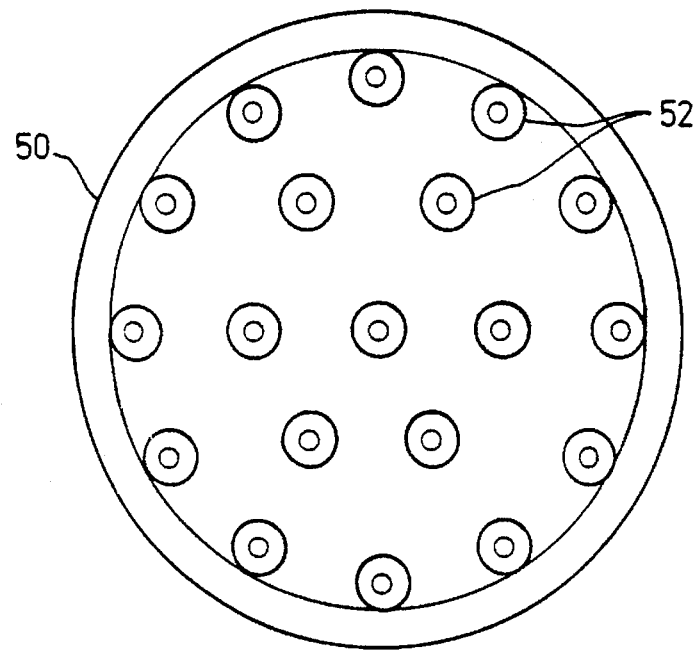
FIG. 6 is a plan view of a retainer plate according to the present invention.
Figure 7:
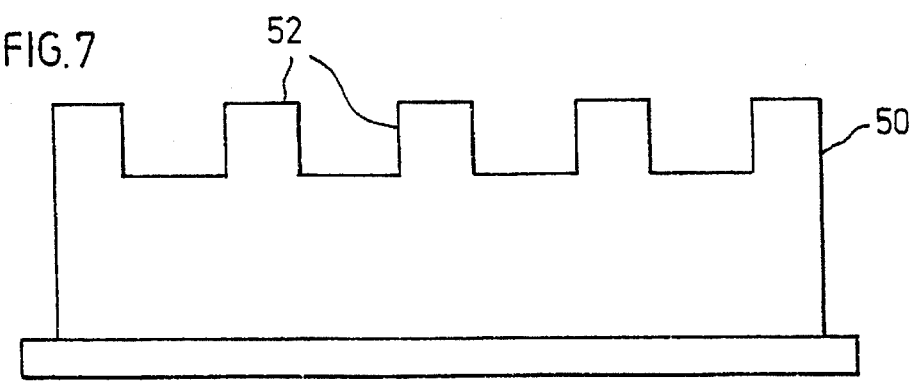
FIG. 7 is a side view of the retainer plate of FIG. 6.

Preferably, retainer plate 50 includes a plurality of openings. Most preferably, these openings correspond to the openings in base 30. Most preferably, retainer plate 50 includes a plurality of hollow protrusions 52 (FIGS. 3, 6 and 7) sized and located to accommodate at least a portion of tubes 32 of head plate 16.

While the invention has been described with respect to a limited number of embodiments, it will be appreciated that many variations, modifications and other applications of the invention may be made.

What is claimed is:

1. A device for washing an animal, comprising:
   (a) a housing having a water inlet and a water outlet;
   (b) a head plate mounted on said housing in the vicinity of said water outlet, said head plate having a base and a plurality of outwardly extending flexible hollow tubes formed with said base, said hollow tubes being hydraulically connected to said housing; and (c) a substantially rigid retainer plate mounted at said water outlet of said housing and immediately adjacent to said head plate such that the space between the retainer plate and the head plate is minimized.

2. The device of claim 1, wherein said housing includes a handle.

3. The device of claim 1, wherein said housing includes a mechanism for controlling flow rate of the water through said housing.

4. The device of claim 1, wherein said housing further includes a compartment for accommodating an additive, said compartment being hydraulically connected to said housing.

5. The device of claim 4, wherein said additive is a cleaning agent.

6. The device of claim 4, wherein said additive is shampoo.

7. The device of claim 4, wherein said additive is soap.

8. The device of claim 4, wherein said additive is medication.

9. The device of claim 1, wherein said tubes are substantially cylindrical in shape.

10. The device of claim 1, wherein said tubes are substantially conical in shape.

11. The device of claim 1, wherein said tubes have lengths which are substantially equal.

12. The device of claim 1, wherein said retainer plate includes a plurality of hollow protrusions sized and located to accommodate at least a portion of said tubes of said head plate.

13. The device of claim 1, wherein a portion of said housing near said water outlet is externally threaded and further comprising an internally threaded ring for connecting said head plate to said housing.

14. The device of claim 1, wherein said head plate and said water outlet are substantially circular.

15. The device of claim 1, wherein said retainer plate and said water outlet are substantially circular.

16. The device of claim 1, wherein said tubes are disposed on said head plate in a circular pattern.

17. The device of claim 1, wherein said tubes are disposed on said head plate in a pattern which includes at least two concentric circles.

\* \* \* \* \*